(12) United States Patent
Muroi

(10) Patent No.: US 9,127,468 B2
(45) Date of Patent: Sep. 8, 2015

(54) BUILDING

(76) Inventor: Ko Muroi, Tochigi (JP)

( * ) Notice: Subject to any disclaimer, the term of this patent is extended or adjusted under 35 U.S.C. 154(b) by 0 days.

(21) Appl. No.: 14/129,696

(22) PCT Filed: Oct. 5, 2011

(86) PCT No.: PCT/JP2011/072961
§ 371 (c)(1),
(2), (4) Date: Feb. 22, 2014

(87) PCT Pub. No.: WO2013/001662
PCT Pub. Date: Jan. 3, 2013

(65) Prior Publication Data
US 2014/0157690 A1 Jun. 12, 2014

(30) Foreign Application Priority Data
Jun. 27, 2011 (JP) .................................. 2011-142225

(51) Int. Cl.
E04H 9/02 (2006.01)
F24F 5/00 (2006.01)
F24F 3/16 (2006.01)
E04B 1/98 (2006.01)

(52) U.S. Cl.
CPC .............. *E04H 9/028* (2013.01); *F24F 5/0035* (2013.01); *E04B 1/98* (2013.01); *F24F 2003/1653* (2013.01); *F24F 2221/44* (2013.01); *Y02B 30/545* (2013.01)

(58) Field of Classification Search
CPC ............ E04H 9/00; E04H 9/021; E04H 9/10; E04H 9/028; F24F 5/0035; F24F 2221/44; F24F 2003/1653; E04B 1/92; E04B 1/98; E04B 1/985; E04B 2001/925
USPC ........ 52/79.1, 79.9, 79.11, 79.12, 79.14, 233, 52/236.1, 236.2, 236.3, 236.4, 236.5, 52/236.6, 79.2, 79.3, 79.4, 167.4, 167.5, 52/169.6, 169.1, 169.7
See application file for complete search history.

(56) References Cited

U.S. PATENT DOCUMENTS

| | | | | |
|---|---|---|---|---|
| 3,207,705 A * | 9/1965 | Hall | ............................. | 252/478 |
| 5,199,231 A * | 4/1993 | Dever | ........................... | 52/79.1 |
| 5,564,536 A * | 10/1996 | Lai | ................................ | 188/379 |
| 5,794,389 A * | 8/1998 | Vysma | ......................... | 52/169.6 |
| 5,816,559 A * | 10/1998 | Fujimoto | .................... | 248/636 |
| 5,974,743 A * | 11/1999 | Vaia | ............................. | 52/169.6 |
| 6,360,496 B1 * | 3/2002 | Raccuglia | ................... | 52/169.1 |
| 6,944,996 B1 * | 9/2005 | Rowe | .......................... | 52/236.1 |
| 8,615,940 B2 * | 12/2013 | Liu et al. | ..................... | 52/173.3 |
| 2008/0053034 A1 * | 3/2008 | Matechuk et al. | ............. | 52/702 |
| 2011/0214364 A1 * | 9/2011 | Fuller | ......................... | 52/173.3 |

FOREIGN PATENT DOCUMENTS

| JP | H06-346476 | 12/1994 |
|---|---|---|
| JP | H06-346478 | 12/1994 |

* cited by examiner

*Primary Examiner* — Jessica Laux
(74) *Attorney, Agent, or Firm* — Leighton K. Chong

(57) ABSTRACT

A building is provided in which safety, comfort, and economic efficiency are improved by an enclosed structure and by shielding from an exterior. The building has a foundation 3, a wall 8 standing around the foundation 3 so as to be integrated with the foundation 3, a housing section 2 serving as an interior space arranged in a center of the foundation 3, a roof 30 covering an internal space surrounded by the wall 8, the roof 30 being supported by the wall 8 and not structurally combined with the housing section 2, and seismic isolation mechanisms 40 for suppressing vibration of the housing section 2 upon generation of earthquake. An interior of the building is formed as an enclosed space defined by the foundation 3, the wall 8, and the roof 30.

15 Claims, 8 Drawing Sheets

BUILDING

This U.S. patent application is a national-stage application claiming the right of priority under 35 U.S.C. 365, based on the prior-filed PCT International Application JP2011/072961 filed on Oct. 5, 2011

TECHNICAL FIELD

The present invention relates to a building of the type that includes, in its technical meaning, a house, a store, a performance hall, a warehouse, and other similar facilities, and is improved in safety, comfort, and economic efficiency thereof. More specifically, it relates to a building having therein internal space formed as an enclosed structure which can prevent various influences occurring at the time of disasters such as an earthquake from exerting on the internal space, and also having a capability of reducing energies such as electricity.

BACKGROUND ART

In general, a building, for example, a house is mainly formed of pillars, a wall, and a roof, and the pillars stand on the ground by means of a concrete foundation. With a building in which pillars are incorporated, the Building Standards Act in Japan specifies thickness of a pillar and the number of stories, and the like in accordance with the number of story of the building. In addition, as the number of story is increased, an occupancy ratio of the pillars in the building is increased and as a result, utilization efficiency is decreased. Further, since a periphery of the building built on the ground is exposed to the outside air, enormous energies are uselessly discharged from the building, so that global warming is increased.

Therefore, the present applicant (also the inventor of the present application) has invented an underground structure with which a group of pillars standing from the ground can be eliminated and cooling and heating effects are improved, and filed a patent application seeking a patent on the invention which was disclosed in Japanese Patent Application JPA-H06-346476. This underground structure includes a peripheral wall section defining therein a space of mortar-shape in the underground, a plurality of supporting members provided around the mortar-shape space to have respective heights reaching the same plane, beams, each having ends supported by the plurality of supporting means, a story structural body having floor sections arranged in a central part thereof at least with a predetermined spacing from the peripheral wall section, and stairs provided in an up and down direction so that the upper end thereof reaches the aboveground along the peripheral wall section and the lower part thereof arrives at the floor sections of the story structural body. Thus, the story structural body is supported by the plurality of supporting members so that each of the floors may be independent. Entrance and exit of the floors are made easier, safety can be improved, energies can be saved, and construction cost can be reduced.

The inventor of the present applicant has invented an underground structure in which a covering member is detachably provided in an upper space part of an uppermost floor section of a story structural body in a similar structure to the Japanese Patent Application JPA-H06-346476 described above, and filed a patent application seeking a patent for that invention which was disclosed in Japanese Patent Application JPA-H06-346478. According to this latter structure, an underground space having a mortar-shape can be blocked and isolated from the outside air, so that the underground space can be used as, for example, a nuclear shelter.

SUMMARY OF INVENTION

Technical Problem to be Solved by the Invention

The underground structure as disclosed in the above-mentioned patent literatures has succeeded to eliminate provision of pillars and to contribute to energy saving. Nevertheless, in consideration with the fact that the Great East Japan Earthquake on Mar. 11, 2011 was far beyond the scope of the original assumption, there is a need for concerning about livelihood support at the time of disaster occurrence such as an earthquake, a tsunami, a fire, a typhoon, and a tornado much more than before. At the time of such disaster occurrence, there is a need for sufficiently concerning about prevention of external contaminant invasion, noise pollution prevention, further energy saving of cooling and heating, and the like so as to protect a living environment, and being prepared for continuing the daily living and daily businesses even at the time of disaster occurrence.

Thus, the present invention was achieved by taking into consideration the above-described problems.

Therefore, an object of the present invention is to provide a building in which safety, comfort, and economic efficiency are improved by making the building such as a house, a store, a performance hall, a warehouse, and other similar facilities an enclosed structure so as to be blocked and isolated from an exterior.

Another object of the present invention is to provide a building in which an internal space concerning a comfortable living space and energy saving even at the normal time is provided so as to stabilize an internal temperature of the building from winter season to summer season, the building being capable of protecting an internal environment of the building so as to provide good and sound sleep among urban noises.

A further other object of the present invention is to provide a building that is capable of responding to various disasters such as an earthquake, a tsunami, a fire, a typhoon, and a tornado.

Solution to Problem

In order to solve the above problems and to achieve the above-described objects, the present invention provides a building including a foundation, a wall standing around the foundation so as to be integrated with the foundation, a housing section arranged on the foundation to define therein an interior space, a roof covering an internal space surrounded by the wall, the roof being supported by the wall and not structurally combined with the housing section, and a seismic isolation mechanism for suppressing vibration of the housing section at the time of an earthquake, wherein the foundation, the wall, and the roof are arranged to define therein an interior that is formed as an enclosed space.

In order to further solve the above problems, the present invention provides a building wherein the housing section of the building is supported by the foundation, and the seismic isolation mechanism is provided between the foundation supporting the housing section and the housing section.

In order to still solve the above problems, the present invention provides a building wherein the housing section of the building is suspended from and supported by the roof, and the seismic isolation mechanism is provided between the roof that suspends and supports the housing section and the housing section.

In order to still solve the above-mentioned problems, the present invention provides a building wherein the building is formed in a manner such that an upper portion of the wall is positioned to be higher than the roof.

In order to further solve the above problems, the present invention provides a building wherein the building includes a pond provided around the housing section, and a planting section provided between the wall and the pond in a stepwise manner, in which an upper portion thereof is used as a planting space and a space is formed in an interior so as to be used as an installment space.

In order to solve the above problems, the present invention provides a building wherein the wall of the building is formed of waterproof concrete having a thermal insulation property.

In order to solve the above problems, the present invention provides a building wherein the roof of the building is provided with a solar panel which is attached to one part of a surface of the roof, and a soundproof and daylighting double glass is arranged in other spaces except for the one part of the surface.

In order to further solve the above problems, the present invention provides a building wherein the building is formed to further include a ventilation air conditioner for purifying an air outside the housing section, sending the air into the housing section, and exhausting the air inside the housing section.

In order to still further solve the above problems, the present invention provides a building wherein an interior space in the housing section of the building is formed to have a regular square shape.

In order to still further solve the above problems, the present invention provides a building wherein the building further includes a meltwater collection means capable of transferring and sprinkling water in the pond onto the planting space and/or the roof, and permitting the water that has been sprinkled onto the roof to thereby melt snow accumulated thereon to be stored in the pond.

In order to further solve the above problems, the present invention provides a building wherein the building is provided with means for transferring the water in the pond to a high place thereby dropping the water, so that an interior of the building is cooled down by vaporization heat of vaporization of minute water drops generated by dropping the water, and a heat exchange means for utilizing geothermal heat which is provided on the bottom surface side of the foundation, whereby the interior of the building is heated by the geothermal heat.

In order to further solve the above problems, the present invention provides a building wherein the foundation, the wall, and the roof of the building are shielded with lead and concrete to thereby allow the building to be capable of being used as a nuclear shelter.

Advantageous Effects of Invention

With the building according to the present invention, there are effects such that the building can be blocked from the exterior by making the building the enclosed structure, and that a safe and secure building even at the time of disasters can be provided by suppressing the vibration of the housing section by the seismic isolation mechanism upon occurrence of an earthquake.

Since the wall is higher than the roof, there is such an effect that the housing section does not receive any adverse crosswind.

Since the planting section is provided inside, agricultural crops can be cultivated inside the building. Thus, there is provided an effect such that food can be ensured even at the time of disasters by consuming the crops.

Since the entire building can be enclosed and the wall is formed of the waterproof concrete having the thermal insulation property, there are effects that even upon water disasters such as a flood and a tsunami, damages such as an immersion can be prevented, and that spread of peripheral fires can be prevented.

Since the solar panel is arranged in a portion of the roof, necessary electricity can be ensured. Further, in the other portion of the roof, the daylighting double-glazed glass is arranged and therefore, such additional effects can be provided that daylight inside the building can be surely acquired and that external noises can be reduced.

By providing the ventilation air conditioner, there is provided an effect such that a necessary amount of air can be surely supplied even in the enclosed building.

Since a residential space of the housing is formed in the shape of a regular square, there is provided an effect such that residents can move between respective rooms by the shortest distance.

By utilizing the water in the pond for sprinkling, there are provided such effects that the water can be used for temperature adjustment inside the building, cultivation of agricultural crops, snow melting and the like, and further that fishes or the like can be reared in the pond.

There is an effect that the temperature adjustment in the building can be achieved by utilizing the geothermal heat.

Since the foundation, the wall, and the roof shield radioactivity, there is an effect that the building can be used as a nuclear shelter as required.

DESCRIPTION OF EMBODIMENTS

[Configuration of Building]

Figure 1:
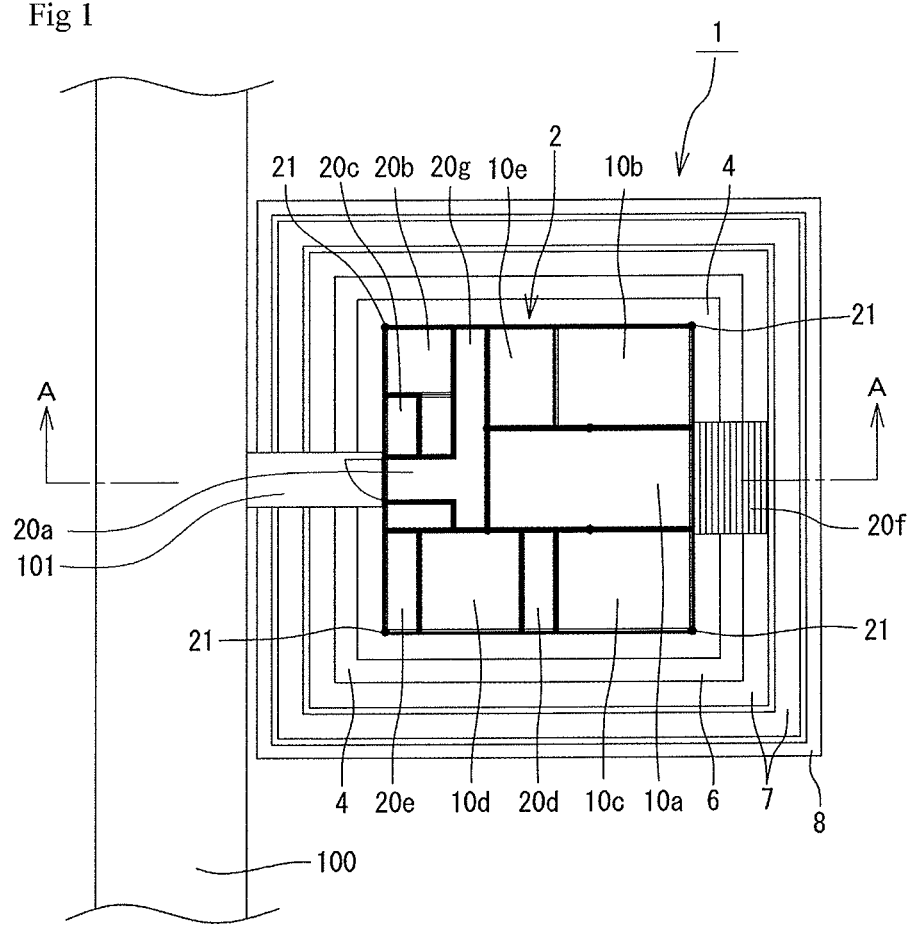
FIG. 1 is a plan view illustrating an embodiment of a building according to the present invention from which a roof is removed.
Figure 2:
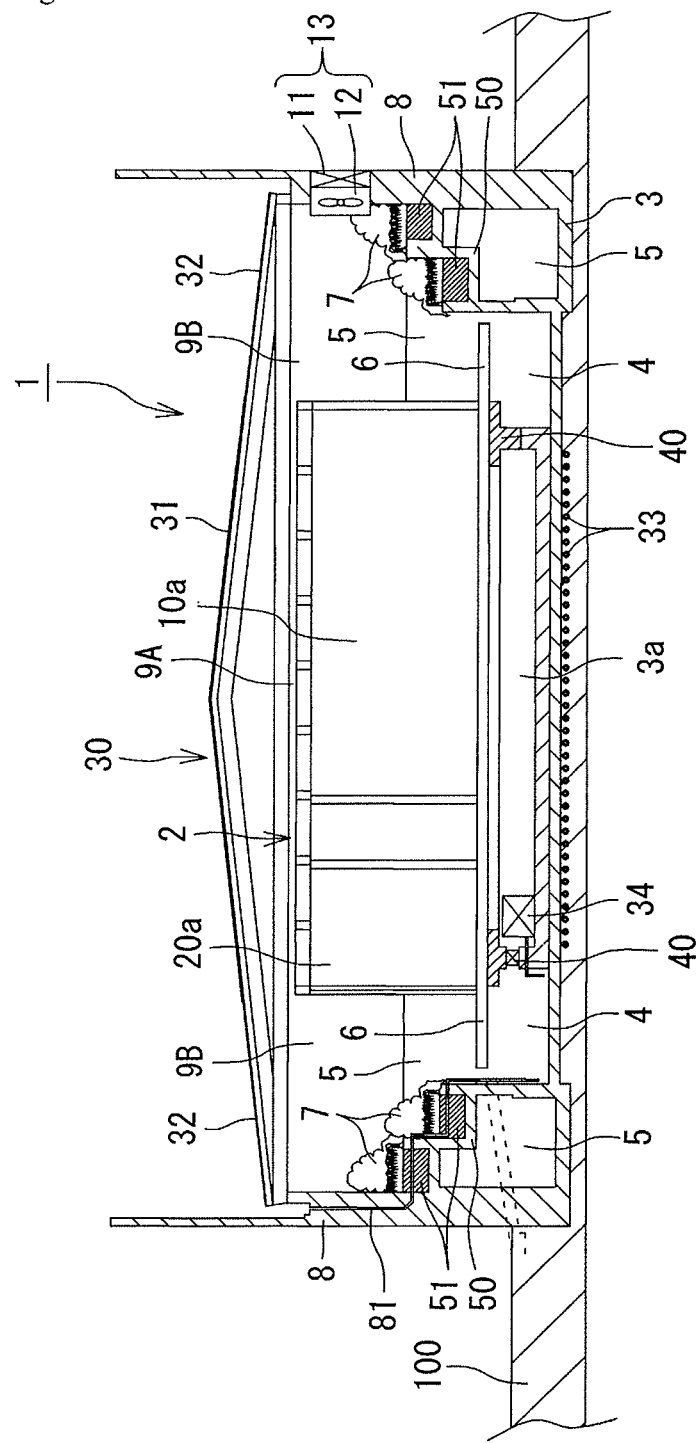
FIG. 2 is a cross-sectional view taken along the line A-A of the building according to the embodiment of FIG. 1.
Figure 3:
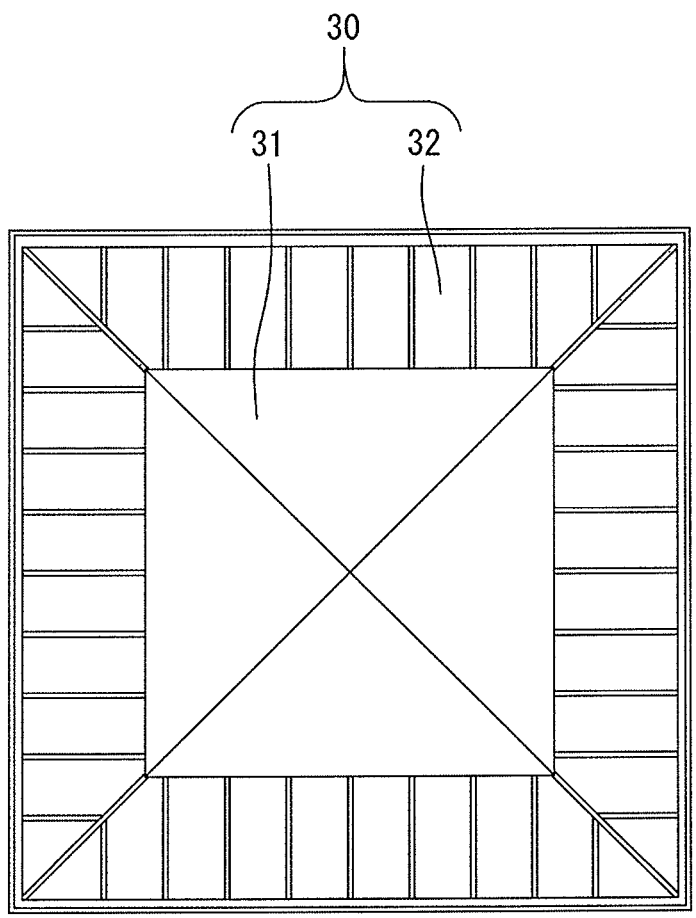
FIG. 3 is a plan view of a roof part of the building according to the present invention.

Hereinafter, a building according to the present invention will be described in detail with reference to one preferred embodiment thereof. FIG. 1 is a plan view illustrating the building according to the preferred embodiment of the present invention, FIG. 2 is a cross-sectional view thereof, and FIG. 3 is a plan view of a roof. It should be noted that FIG. 1 illustrates a state that the roof is removed for the brevity sake.

A building 1 is built so as to be opposite a passageway (sidewalk) 100 of a public way or the like, and entrance and exit can be made by way of a passageway 101 serving as a private passage leading to the passageway 100.

The building 1 is generally provided with a square foundation 3, and a wall 8 standing to surround the foundation 3 so as to be integrated with the foundation 3, and formed as one container in which the foundation 3 and the wall 8 are integrally incorporated. A housing section 2 serving as an interior space is arranged in a substantial center of the foundation 3. Meanwhile, a roof 30 is attached so as to cover a space formed by the foundation 3 and the wall 8. A peripheral edge part of the roof 30 is supported by the wall 8, but the roof per se is not structurally combined with the housing section 2. Hence, an interior of the building 1 can be formed into a water-tight or air-tight enclosed space by means of the foundation 3, the wall 8, and the roof 30. The wall 8 is formed to be higher than the roof 30. By forming the wall 8 to be higher than the roof 30, crosswind blowing to the housing section 2 to be described later can be effectively prevented. The foundation 3 and the wall 8 are framed by reinforced concrete, the housing 2 is framed by steel or reinforced concrete, and the roof 30 is framed by steel, and then covered with metallic materials such as iron plates and steel plates, so that an internal space of the building 1 can be enclosed. It should be noted that regarding a building structure, as long as the structure is physically strong enough, steel frame, reinforced concrete, or an appropriate combination of the steel frame and the reinforced concrete may be adopted. The concrete itself may be formed to have, for example, a waterproof layer thereon made of a water repellent or a synthetic resin or the like, a waterproof property of the concrete can be surely enhanced. The wall 8 can have a thermal insulation property by arranging a thermal insulation material or making a double structure in which a thermal insulation material is provided to intervene between concretes. Further, by providing the wall with a lead plate together, the structure of the building can prevent invasion of radioactivity.

Figure 4:
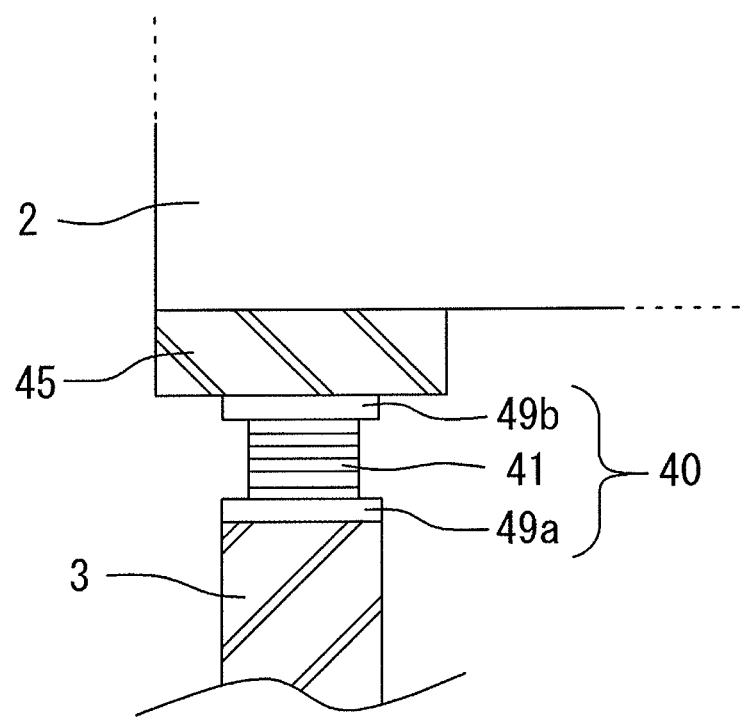
FIG. 4 is a cross-sectional and partial view illustrating a configuration of a seismic isolation mechanism.

The building 1 is provided with seismic isolation mechanisms 40 incorporated therein for suppressing vibration of the housing section 2 at the time of occurrence of any earthquake. In the present embodiment, the respective seismic isolation mechanisms 40 of the building 1 are installed in the portions of the building where the foundation 3 and the housing section 2 are connected to one another. The seismic isolation mechanisms 40 have at least either one of functions of isolating, dampening, and cutting the vibration. A specific configuration thereof includes, for example, an air damper type, an isolator type with a laminated rubber, and a type of using a ball or a roller, and the mechanisms have been supplied by a certain number of manufacturers in Japan. For example, the seismic isolation mechanism 40 illustrated in FIG. 4 is a structure classified as the isolator type, and substantially has a configuration such that tubular natural-rubber laminated rubber isolator 41 is inserted between a lower flange 49a and an upper flange 49b both of which are formed in a disc shape. This seismic isolation mechanism 40 is installed between the foundation 3 of the housing section 2 and a base part 46 of the housing section 2. The seismic isolation mechanisms 40 are arranged at four corner areas around the housing section 2 and at some necessary positions. When an earthquake at a large scale occurs, the laminated rubber isolator 41 is warped depending on seismic intensity thereof to thereby prevent vibration of the earthquake from being transmitted to the housing section 2, so that isolation of the vibration may be achieved. By providing such seismic isolation mechanisms 40, even upon occurrence of a strong and huge earthquake or the like, consequent vibration can be suppressed by the seismic isolation mechanisms 40, so that an influence on the housing section 2 may be remarkably reduced.

Figure 7:
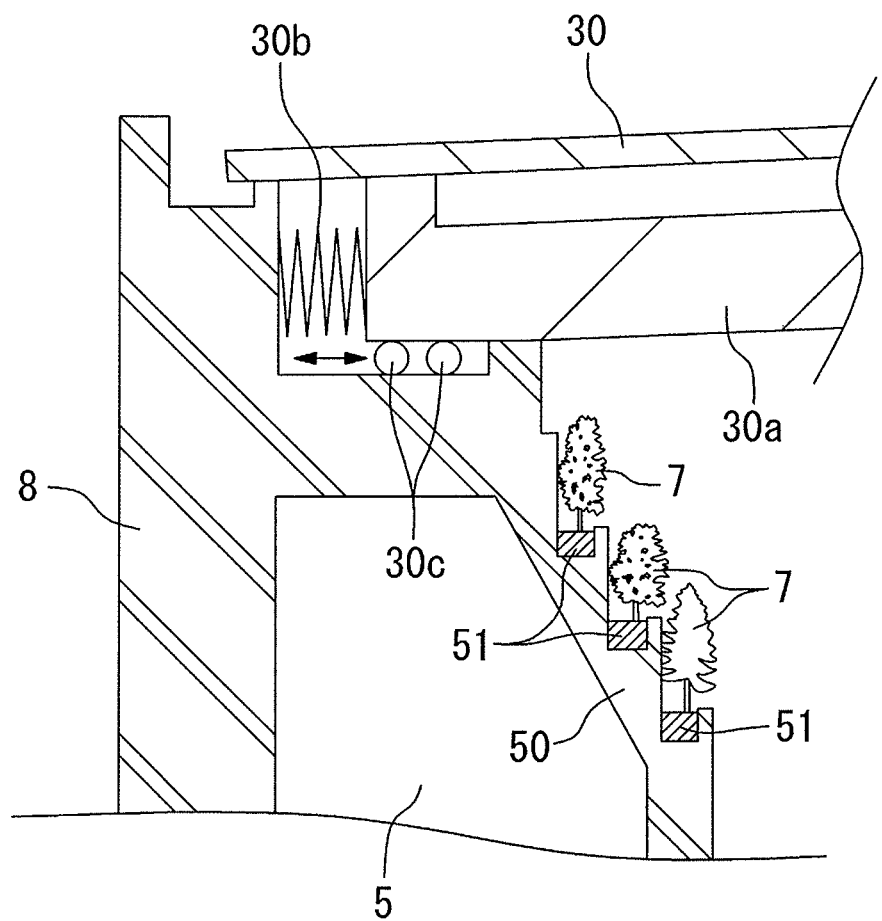
FIG. 7 is a partially enlarged cross-sectional view of a seismic isolation structure incorporated in the roof.

Moreover, as best illustrated in FIG. 7, an elastic member such as a spring 30b is arranged between the roof 30 and the wall 8, more specifically between a beam 30a forming the roof 30 and an upper side face of the wall 8, and rollers 30c movably supporting a bottom surface of the beam 30a are arranged in a recessed part of an upper end face of the wall 8. Hence, a load applied to the connection portions between the roof 30 and the wall 8 by the vibration of the earthquake can be reduced.

As another configuration embodying the seismic isolation mechanisms, the housing section 2 may not be installed in the foundation 3 but suspended from and supported by the roof 30, the housing section 2 may be isolated from the foundation 3, and the seismic isolation mechanisms may be installed in portions of the building where the roof 30 and the housing section 2 are connected to one another. In this case, the housing section 2 is suspended in an enclosed container in which the foundation 3, the wall 8, and the roof 30 are integrally incorporated. Thus, the vibration of the earthquake is prevented from transmitting to the housing section 2. It should be noted that not anything is placed between the housing section 2 and the foundation 3 but a certain suitable fixing tool is preferably secured so that the housing section 2 is neither shaken nor vibrated in a normal circumstance other than the earthquake. As a matter of course, this securing by the fixing tool is not intended to provide any structural means endurable against earthquake shaking since the seismic isolation mechanisms installed between the roof 30 and the housing section 2 exhibits an isolating function in case of the earthquake. Namely, the fixing tool does not have to bear vibration of a large scale earthquake.

Generally, the housing section 2 includes a plurality of rooms 10 (such as a living room 10a, a dining room 10b, a bedroom 10c, a study 10d, and a kitchen 10e) and a plurality of living spaces 20 (such as an entrance 20a, a bathroom 20b, a toilet 20c, a closet 20d, a library 20e, a terrace 20f, and corridor 20g). A pond 4 is provided so as to surround the housing section 2.

A planar shape of the housing section 2 is formed in a regular square, and thereby, residents can move between the rooms by the shortest distance. By installing monitoring cameras in the toilet 20c and predetermined rooms 10, a person who needs care and an ailing person can be provided with nursing care. The desired number of sprinklers (not illustrated) is provided at necessary places among the rooms 10 and the living spaces 20, and tap water from the waterworks or water of the pond 4 to be described later can be used as a water source thereof. An outer wall of the housing section 2 is formed with waterproof concrete having a thermal insulation property and pillars 21 are provided at necessary points of the housing section. By the outer wall of the housing section 2 having the waterproof concrete having the thermal insulation property, the building 1 can become further resistant to a fire and water disasters. An enclosed chamber utilizing the foundation 3 and a stock area 3a of a waterproof structure are provided under the housing section 2. It should be noted that although the housing section 2 of the present embodiment is a one-story building, the housing section is not limited to this but may be two or more story building.

As illustrated in FIG. 2, the roof 30 is supported by the wall 8 in a state such that the roof is arranged in an upper part of a frame forming the housing section 2 and not structurally coupled to a framework of the housing section 2, so that a narrow space 9A is formed between the roof 30 and the framework of the housing section 2. As illustrated in FIG. 3, a solar panel 31 is installed in a range overlapping with the outer wall of the housing section 2 in a center part of the roof 30, and a top light 32 covered with a reinforced double-glazed glass is provided around the solar panel (in a range overlapping with a space 9B). Further, an upper part of the wall 8 where an edge part of the roof 30 is positioned is formed in a gutter-like shape so as to guide rainwater. Rainwater collection pipes 81 for guiding the rainwater stored in the upper part are provided at plural positions thereby allowing rain having fallen on the roof 30 to be stored in the pond 4, so that effective use of the rainwater is achieved. The electricity obtained by the solar panel 31 can be used for lighting, cooling and heating and the like of the house or sold to an electric power company or the like. It should be noted that in place of the solar panel 31 or together with the solar panel 31, a warm water facility by solar heat may be provided.

Regarding the reinforced double-glazed glass, a standardized one which can bear a load of an accumulated snow reaching 4 m is preferably used. More specifically, the reinforced double-glazed glass is a laminated glass including an outer glass of a doubly-reinforced glass having thickness of 12 mm, and an inner glass of a wire glass having thickness of 6.6 mm. Hence, an interior of the building 1 is brought into a blocked state from the outside air, so that a temperature in the building 1 can be stably maintained, noises from an exterior are blocked, and a neighborhood fire, if it occurs, may be prevented from spreading over the housing section 2. A ventilation air conditioning facility 13 including a special filter 11 and a fan 12 is provided at a point where the space 9B in the building 1 communicates with the outside air, specifically, as illustrated in FIG. 2, at one given place or a plurality of places in the vicinity of the wall 8 and the roof 30, so as to purify the air coming in the spaces 9A, 9B of the building 1. It should be noted that when the ventilation air conditioning facility 13 further includes an intake fan and an exhaust fan or an integrated ventilation fan (and also including a filter or the like according to need), it is possible to execute exchanging of the air inside the building 1 with the air of the exterior. The special filter 11 not only removes dust and the like in the air but also prevents bacteria, harmful substances, radioactive substances, and the like from coming into the building 1.

Since a peripheral portion of the roof 30 is formed in the top light 32, an external light comes into the space 9B of the building 1. Thus, lack of sunlight to the pond 4 and plants 7 of a planting space 51 can be eliminated, and a thermal insulation effect can be obtained. On hot days in the summer season, the water of the pond 4 is pumped up and dropped from the roof 30, or sprinkled or scattered onto a surface of the roof 30 so as to lower a temperature in the spaces 9A, 9B and in the housing section 2 by vaporization heat at the time of vaporization of minute water drops generated at that time. A specific example thereof will be described with reference to FIG. 5.

Figure 5:
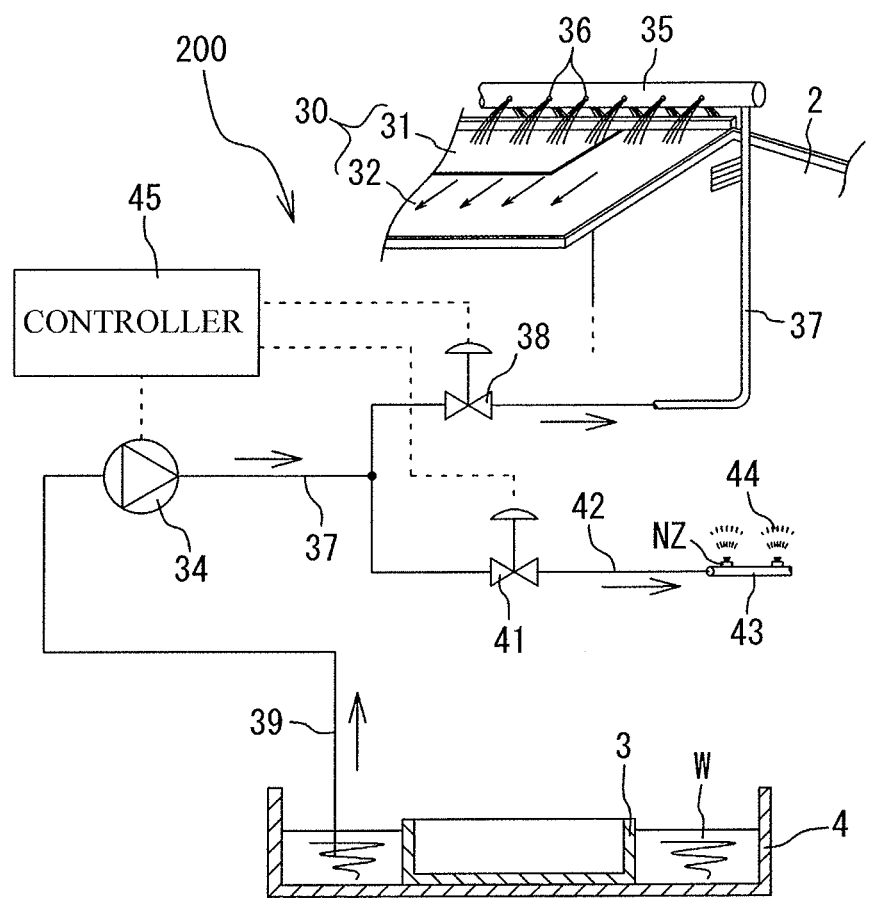
FIG. 5 is a systematic view illustrating a configuration of a water sprinkling mechanism.

FIG. 5 is a diagrammatic and systematic view illustrating the configuration of a water sprinkling mechanism 200. A header 35 in which a plurality of nozzles 36, 36 is arranged at a predetermined interval is provided in parallel on the upper side of a "ridge beam" of the roof 30, and a water supply pipe 37 is connected to one end of the header. The water supply pipe 37 is connected to the outlet of a pump 34 via a valve 38. A pipe 39 extending into water W of the pond 4 is connected to the inlet of the pump 34. A pipe 42 having a valve 41 at an intermediate position thereof is connected to the water supply pipe 37. A water sprinkling pipe 43 in which a plurality of nozzles NZ for sprinkling or scattering the water onto the plants 7 is provided at a predetermined interval is connected to a terminal end of this pipe 42. Sprinkling or scattering of water designated at 44 is performed by the use of pressurized water supplied from the pump 34. The pump 34 and the valves 38, 41 are controlled by a controller 45 installed in the living room 10a or the like in an interior. This controller 45 includes a CPU capable of acting in accordance with a predetermined program and also executes control of cooling and heating to be described later.

When a command for cooling the roof 30 is outputted by the operation of the controller 45, the pump 34 is activated and the valve 38 is opened, and the water of the pond 4 is supplied to the header 35 on the roof 30 through the pump 34, the pipes 39, 37, and the valve 38, and then sprinkled onto the surface of the roof from the nozzles 36. The temperature in the spaces 9A, 9B is lowered by the vaporization heat at the time of vaporization of the minute water drops generated by this water sprinkling. For example, even in a case where an outside temperature is 35° C., the temperature in the spaces 9A, 9B can be kept at a temperature of 26° C. or less. Almost all the water dropped down from the roof 30 can be collected into the pond 4 by the rainwater collection pipes 81. Thus, the water of the pond can be used again.

When the controller 45 is operated upon a need for watering the plants 7 or a timer preliminarily set in the controller 45 runs, the pump 34 is activated and the valve 41 is opened, the water of the pond 4 is supplied to the water sprinkling pipe 43 via the pipe 42 and the valve 41, and the water is sprinkled onto the plants 7. Hence, the plants 7 can be prevented from withering away.

Further, when the water sprinkling mechanism 200 is activated as described above for accumulated snow in the winter season, the snow accumulated on the roof 30 can be melted away. Hence, a burden applied to the roof 30 can be reduced and the water of the pond 4 can be easily supplemented.

A geothermal warm water pipe 33 is installed on a bottom surface of the stock area 3a, that is, the surface on the side of connecting to the soil, for absorbing heat from geothermal heat by heat exchange. Cooling and heating of the housing section 2 can be performed by using water having a temperature of about 15° C. in this geothermal warm water pipe 33. A configuration of this cooling and heating system will be described with reference to FIG. 6.

Figure 6:
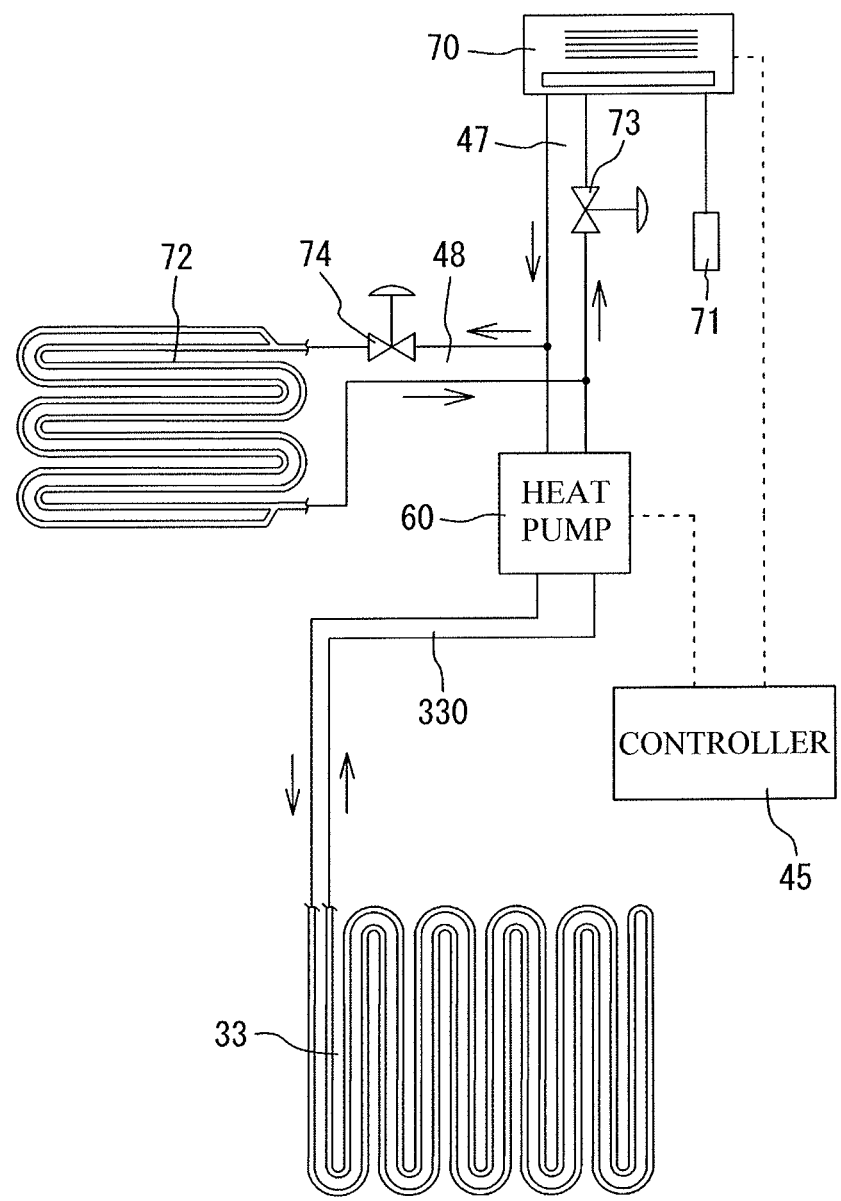
FIG. 6 is a diagrammatic view of a cooling and heating system, illustrating an entire configuration of the system.

FIG. 6 is a systematic view of a cooling and heating system 300. The geothermal warm water pipe 33 installed in a lower part of the pond 4, the geothermal warm water pipe functioning as a heat exchanger meanders in the ground at shallow depth in a region of about a site area of the housing section 2. A heat pump 60 serving as an outdoor unit installed on the ground is connected to this geothermal warm water pipe 33 through a pipe 330. The heat pump 60 includes a heat exchanger, an expansion valve, a compressor and the like (not illustrated). An indoor unit 70 is connected to the heat pump 60 through a pipe 47 and a valve 73. The indoor unit 70 has a remote controller 71 for a user to adjust a room temperature. A pipe 48 is coupled to the pipe 47 via a valve 74. A floor heating panel 72 installed on a floor of the living room 10a and the like is connected to this pipe 48, so that the floor can be cooled or heated. The heat pump 60, the indoor unit 70, and the valves 73, 74 are controlled by the above-described controller 45.

Referring to the configuration shown in FIG. 6, firstly, in a case where the cooling is performed, water in the geothermal warm water pipe 33 is circulated in the heat exchanger in the heat pump 60 and the heat is exchanged, so that a medium in the heat pump 60 is cooled down to, for example, 7° C. The medium is circulated through the pipes 47, 48, and the preliminarily set cool air is discharged from the indoor unit 70 to the interior by rotation of a fan (not illustrated). At the same time, the cooled medium is also supplied to the floor heating panel 72 via the pipe 48, so that the floor in which the floor heating panel 72 is constructed is cooled down to a desired temperature. It should be noted that by setting the controller 45, one of the indoor unit 70 and the floor heating panel 72 can be activated, and in accordance with this selection, turning ON/OFF of the valve 73 and the valve 74 is controlled by the controller 45.

Next, a case where heating is performed will be described in detail. The water in the geothermal warm water pipe 33 is supplied into the heat pump 60, the heat is exchanged, and warm water due to the heat exchange is returned to the geothermal warm water pipe 33. The medium in the pipe 47 warmed by a heat exchanger 62 of the heat pump 60 is supplied to the indoor unit 70, so that the warm air is discharged from a heat exchanger (not illustrated) of the indoor unit 70 to the interior. Similarly, the warmed medium is also supplied to the floor heating panel 72 through the pipe 48, so that the floor is warmed up or heated. In such a way, even when the outside temperature is approximately 0° C. in the winter season, the temperature in the spaces 9A, 9B can be approximately 18° C. by utilizing the geothermal heat.

It should be noted that although the geothermal warm water pipe 33 meanders on the same plane in the present embodiment, in place of this, a pipe body made by bending a metal pipe into a U-shape having length of several meters to several tens of meters is vertically embedded in the ground. Further, although some restrictions are caused in a temperature adjustment range or the like, the heat pump 60 may not be used. In this case, the air after the heat is exchanged by the water W of the geothermal warm water pipe 33 is guided to the interior, and the air in the interior is returned to the heat exchanger from an exhaust port provided in a ceiling or the like and circulated.

The pond 4 stores therein the water so that a necessary water level is maintained. Domesticated or edible fishes can be reared or aquatic plants can be cultivated in the pond 4. As illustrated in FIG. 5, the water of the pond 4 is not only used for temperature adjustment inside the building 1 or water sprinkling but also utilized for snow melting, fire extinguishing at the time of occurrence of disasters, drinking water, or the like. Meanwhile, a stepwise planting section 50 is provided between the pond 4 and the wall 8. Regarding the planting section 50, an upper part is utilized as the planting space 51 and a space formed inside can be utilized as an installment space 5. The planting section 50 is provided so as to go round an inner periphery of the wall 8. Therefore, the installment space 5 made of concrete is provided in a tunnel shape so as to substantially go round the wall 8. The installment space 5 is made so that the water of the pond 4 does not invade an interior thereof and the water or the like at the time of water sprinkling does not invade the interior, and various facilities can be installed and food and the like can be stored in the interior. An upper surface of the installment space 5 is made at a higher position than a water level of the pond 4, and heightened stepwise toward the outside like terraced fields, so that the planting space 51 is formed. The soil is provided on the planting space 51, and the plants 7 such as shrubs, flowers, and vegetables are planted on this provided soil. It should be noted that not only the plants but also art works such as sculpture, craft works, stones, or the like may be installed to enjoy beauty and scenery.

As illustrated in FIG. 1, an upper part of the planting space 51 is covered by the roof 30. Thus, rain does not fall onto the plants 7. As described in FIG. 5, the water of the pond 4 is pumped up by the pump 34 and guided to the water sprinkling pipe 43, so as to be jetted (supplied) to the plants 7. Further, at the time of stopping the tap water in accordance with occurrence of a disaster, a fire, or the like, by purifying or sterilizing the water of the pond 4 with a purifying or sterilizing facility, this purified or sterilized water can be used instead of the tap water. Therefore, the pond 4 desirably has a volume with which water to be utilized for at least about one month can be stored. By covering the entire upper surface or a part of the upper surface of the pond 4 with a plate member or the like, a passageway 6 going round a periphery of the housing section 2 can be provided. The passageway 6 can be utilized as a walking go-round or utilized as a space or the like for enjoying the plants 7.

The building 1 can also be used as a simple shelter at time of occurrence of disasters. For example, when a lead plate, a special lead steel plate, or the like having an effect of blocking radioactivity are provided for the foundation 3, the wall 8, and the roof 30 to be cooperative with the latter elements, the building can be used as the nuclear shelter. By installing a generator of oxygen in the building, exchange of the air with the exterior can be blocked to thereby tightly enclose the interior, so that viruses and the like may be prevented from intruding into the interior. Further, in a case where a tsunami to bring the building 1 under the water attacks, the building 1 is water-tightly enclosed by the foundation 3, the wall 8, and the roof 30, and the water stored in the pond 4 is effective for serving as a ballast. Thus, the building can float in water in a favorable posture so as to avoid going under the water.

Figure 8:
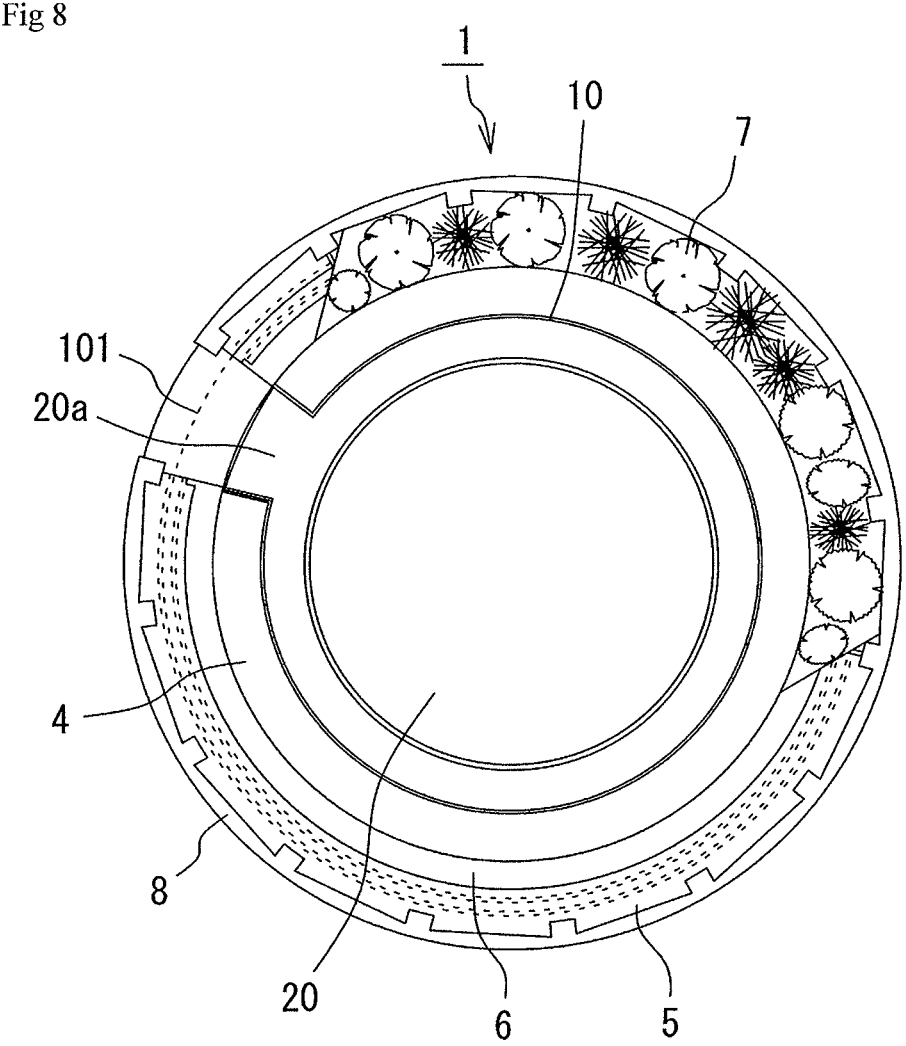
FIG. 8 is a plan view of another embodiment of the present invention.

The building 1 is not limited to the square building described above but various outer shapes of buildings may be adopted. For example, FIG. 8 illustrates a case where the outer shape of the building 1 is formed as a circular shape. It should, however, be noted that since the same or like members as the above-described square building 1 are designated by the same reference numerals, specific description thereof will be omitted for the simplicity sake. Furthermore, although not illustrated, buildings may be a polygon such as a triangle, a pentagon, and a hexagon as a matter of course.

[Effects of Embodiment]

With the building according to the embodiment of the present invention, since the housing section 2 can be enclosed by the foundation 3, the wall 8, and the roof 30, the housing section per se can be blocked from the outside air. There is an effect such that a safe and secure building even at the time of generation of disasters can be provided by suppressing the vibration of the housing section upon an earthquake by the seismic isolation mechanisms.

Since the wall is higher than the roof, the housing section does not receive the crosswind.

Since the planting section is provided inside, agricultural crops can be cultivated inside the building. Thus, the food can be ensured even at the time of disasters by consuming the crops.

Since the entire building can be enclosed and the wall is formed of the waterproof concrete having the thermal insulation property, even upon water disasters such as a flood and a tsunami, damages such as an overflow can be prevented, and spread of peripheral fires can be prevented.

Since the solar panel is arranged in one part of the roof, necessary electricity can be ensured. Since the double-glazed glass is provided in other portions for taking in daylights, while ensuring daylight inside the building, external noises can be reduced. According to examination of the present inventors, with the measures described above, cooling and heating cost for the building could surely be lowered to 75%, for example.

Since the ventilation air conditioner is provided, a necessary air can be ensured even in the enclosed building.

Since a residential space of the housing is a regular square, the residents can move between the respective rooms by the shortest distance.

By utilizing the water in the pond for sprinkling, the water can be utilized for the temperature adjustment inside the building, cultivation of agricultural crops, the snow melting, and the like, and further, fishes can be reared and aquatic plants or the like can be cultivated in the pond. Thus, the residents can continue to live on by themselves without depending on support of a local government or the like.

The temperature adjustment in the building can be performed by utilizing the geothermal heat.

By utilizing the geothermal heat for heating and the like in winter season, the cooling and heating cost can be reduced.

The preferred embodiment of the present invention is described in detail above. However, the present invention is not limited to such a particular embodiment but various modifications and changes can be made within the scope of the gist of the present invention described in the claims needless to say.

Specifically, the building according to the present invention is applicable to uses for facilities other than the house such as an office, a nursing care facility, a hospital, and a public facility.

REFERENCE SIGNS LIST

1 Building
2 Housing section
3 Foundation
3a Stock area
4 Pond
5 Installment space
6 Passageway
7 Plant
8 Wall
9A Space
9B Space
10 Room
10a Living room
10b Dining room
10c Bedroom
10d Study
10e Kitchen
11 Special filter
12 Fan
13 Ventilation air conditioning facility
20 Living space
20a Entrance
20b Bathroom
20c Toilet
20d Closet
20e Library
20f Terrace
20g Corridor
21 Pillar
30 Roof
30a Beam
30b Spring
30c Roller
31 Solar panel
32 Top light
33 Geothermal warm water pipe
34 Pump
35 Header
36 Nozzle
37 Water supply pipe
38 Valve
39 Pipe
40 Seismic isolation mechanism
41 Valve
41 Laminated rubber isolator
42 Pipe
43 Water sprinkling pipe
44 Water sprinkling
45 Controller
46 Base part
47 Pipe
48 Pipe
49a Lower flange
49b Upper flange
50 Planting section
51 Planting space
60 Heat pump
70 Indoor unit
71 Remote controller
72 Floor heating panel
73 Valve
74 Valve
81 Rainwater collection pipe
100 Passageway
101 Passageway
200 Water sprinkling mechanism
300 Cooling and heating system
330 Pipe
NZ Nozzle
W Water

The invention claimed is:

1. A building having a seismic isolation faculty for seismically isolating a housing section of the building from earthquake vibration from the ground comprising:
a foundation laid on the ground providing a structural basis for supporting a building to be erected thereon;
a roof support wall having surrounding sides provided to stand around the foundation extending upwardly a given vertical height and having an upper portions thereof on which peripheral sides of a roof are supported thereon and a lower portions thereof which are integrated with the foundation;
a roof held and supported on peripheral sides thereof by the upper portions of the roof support wall, wherein the foundation, the roof support wall and the roof are configured to define an internal space enclosed by the foundation, the roof support wall, and the roof;
a housing section arranged in the internal space and having an interior space for living positioned in spaced relationship above the foundation and below the roof and seismically isolated therefrom by a seismic isolation mechanism; and
the seismic isolation mechanism comprising at least one seismic isolation unit provided between at least one of the foundation and the roof and the housing section for supporting the housing section in the internal space while having a function of isolating, dampening and/or for suppressing vibration of the foundation or the roof from transmission to the housing section at the time of occurrence of an earthquake.

2. The building according to claim 1, wherein a base part of the housing section is supported on seismic isolation units installed on the foundation.

3. The building according to claim 1, wherein the housing section is suspended by seismic isolation units from and supported by the roof, in order to thereby mitigate transmission of seismic vibration from the roof to the housing section.

4. The building according to claim 1, wherein the upper portions of the roof support wall have a part that is formed to extend vertically higher than the roof, in order to mitigate crosswinds from impacting the roof.

5. The building according to claim 1, further comprising:
a pond provided in the enclosed internal space defined by the foundation, the wall and the roof and around the housing section; and
a planting section provided in the internal space and arranged between the wall and the pond in a stepwise manner, in which an upper portion of the planting section is used as a planting space and another space is formed in an interior of the planting section for being used as an installment space.

6. The building according to claim 5, further comprising:
a melt water collection means capable of transferring and sprinkling water in the pond onto the planting space and/or the roof, and permitting the water that has been sprinkled onto the roof to thereby melt snow accumulated thereon to be stored in the pond.

7. The building according to claim 5, further comprising:
a water transferring means for transferring water in the pond to a high place to permit the water to drop into the enclosed internal space, so that the enclosed internal space of the building is cooled down by vaporization heat of vaporization of minute water drops generated by dropping of the water, and
heat exchanger means for utilizing geothermal heat that is provided on the bottom surface side of the foundation for carrying out heat exchange by geothermal heat to thereby heat the enclosed internal space of the building by the geothermal heat.

8. The building according to claim 1, wherein the wall is formed of waterproof concrete having a thermal insulation property.

9. The building according to claim 1, wherein the roof is provided with a solar panel which is attached to one part of a surface of the roof, and a soundproof and double-glazed glass for taking in daylight is arranged in other spaces except for the one part of the surface.

10. The building according to claim 1, further comprising:
a ventilation air conditioner for purifying an outer air outside of the housing section, sending the purified outer air into the interior space of the housing section, and exhausting the air inside of the housing section outside of the housing section.

11. The building according to claim 1, wherein the interior space of the housing section is formed to have a regular square shape.

12. The building according to claim 1, wherein the foundation, the wall, and the roof of the building are shielded with lead and concrete to thereby allow the building be converted to a nuclear shelter.

13. The building according to claim 1, wherein the at least one seismic isolation unit comprises a first seismic isolation unit arranged to be interposed between the foundation and the housing section in the case where the housing section is supported by only the foundation.

14. The building according to claim 13, wherein the first seismic isolation unit of the seismic isolation mechanism is interposed between the foundation and the housing section and comprises an isolator element, and upper and lower flange members attached to upper and a lower ends of the isolator element, respectively, the isolator element being interposed between the housing section and the foundation such that the upper flange is combined with the housing section and the lower flange is combined with the foundation.

15. The building according to claim 13, wherein the at least one seismic isolation unit further comprises a second seismic isolation unit arranged between a part of the upper portions of the roof support wall and a part of the roof, the second seismic isolation assembly comprising a spring arranged between the upper portions of the roof support wall and the roof, and a plurality of roller elements movable between the upper portions of the roof support wall and the roof in association with a movement of the spring.

* * * * *